United States Patent
Tietze

(10) Patent No.: US 6,340,169 B1
(45) Date of Patent: Jan. 22, 2002

(54) HAND GRIP BRACKET AND ASSEMBLY COMPRISING A HAND GRIP BRACKET AND A HEAD SIDE GAS BAG MODULE

(75) Inventor: Hans-Joachim Tietze, Heubach (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/647,375
(22) PCT Filed: Apr. 1, 1999
(86) PCT No.: PCT/EP99/02254
§ 371 Date: Sep. 29, 2000
§ 102(e) Date: Sep. 29, 2000
(87) PCT Pub. No.: WO99/51457
PCT Pub. Date: Oct. 14, 1999

(30) Foreign Application Priority Data

Apr. 2, 1998 (DE) .................................. 298 06 080 U

(51) Int. Cl.[7] .............................................. B60R 21/16
(52) U.S. Cl. .................................. 280/728.2; 280/730.2
(58) Field of Search ........................... 280/728.2, 730.1, 280/730.2, 728.3, 732; 248/222.11, 222.12, 300; 296/153, 152

(56) References Cited

U.S. PATENT DOCUMENTS

| | | | | |
|---|---|---|---|---|
| 2,806,737 A | * | 9/1957 | Maxwell | 280/730.1 |
| 3,403,641 A | * | 10/1968 | Baker | 108/152 |
| 3,545,712 A | * | 12/1970 | Ellis | 248/224 |
| 4,536,094 A | * | 8/1985 | Whitehead | 248/221.3 |
| 4,549,382 A | * | 10/1985 | Byrd, Jr. | 248/221.3 |
| 5,121,893 A | * | 6/1992 | Kiong et al. | 248/222.11 |
| 5,462,308 A | * | 10/1995 | Seki et al. | 280/730.2 |
| 6,073,961 A | * | 6/2000 | Bailey et al. | 280/730.2 |
| 6,079,735 A | * | 6/2000 | Fallman et al. | 280/730.2 |
| 6,082,761 A | * | 7/2000 | Kato et al. | 280/730.2 |
| 6,102,434 A | * | 8/2000 | Ohlert et al. | 280/728.2 |
| 6,106,007 A | * | 8/2000 | Kretschmer et al. | 280/730.2 |
| 6,142,506 A | * | 11/2000 | Patel et al. | 280/728.2 |
| 6,152,485 A | * | 11/2000 | Kato | 280/728.2 |
| 6,155,594 A | * | 12/2000 | Ibe et al. | 280/728.2 |
| 6,158,767 A | * | 12/2000 | Sinnhuber | 280/730.2 |
| 6,170,861 B1 | * | 1/2001 | Tietze | 280/728.2 |
| 6,173,990 B1 | * | 1/2001 | Nakajima et al. | 280/730.2 |
| 6,189,918 B1 | * | 2/2001 | Stavermann | 280/730.2 |

FOREIGN PATENT DOCUMENTS

| | | |
|---|---|---|
| DE | 9206175 | 9/1992 |
| DE | 9213972 | 1/1993 |
| DE | 19608275 | 10/1996 |
| DE | 19612228 | 10/1997 |
| DE | 19612229 | 10/1997 |
| DE | 19747703 | 5/1999 |
| EP | 080956 | 10/1997 |

* cited by examiner

Primary Examiner—Brian L. Johnson
Assistant Examiner—Joselynn Y. Sliteris
(74) Attorney, Agent, or Firm—Tarolli, Sundheim, Covell, Tummino & Szabo, L.L.P.

(57) ABSTRACT

A hand grip bracket for the attachment of a hand grip in the vehicle also serves to hold a head side gas bag module (50). For this purpose, the hand grip bracket has a bow-shaped holder (22) in which the housing (52) of the side gas bag module (50) has been inserted and to which it is attached.

16 Claims, 2 Drawing Sheets

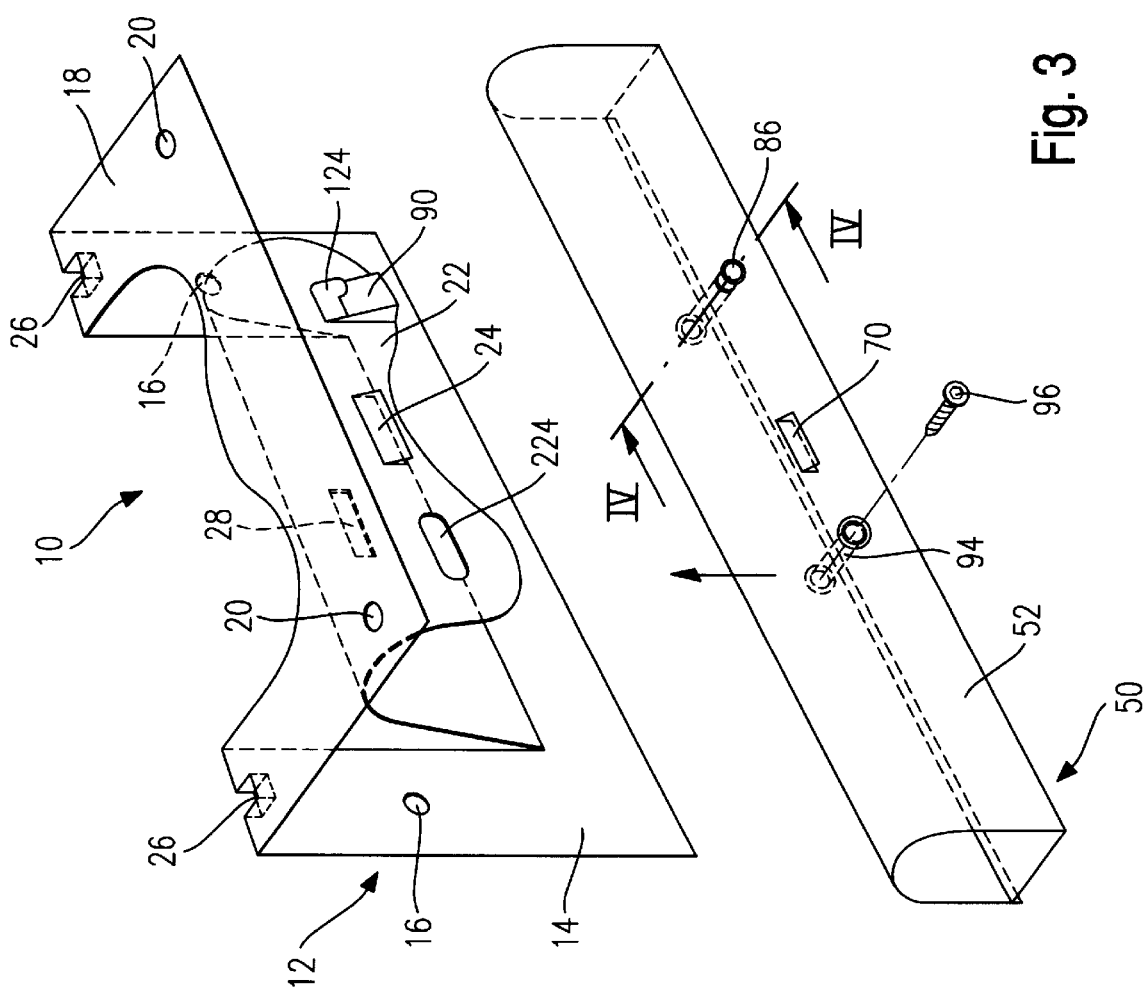
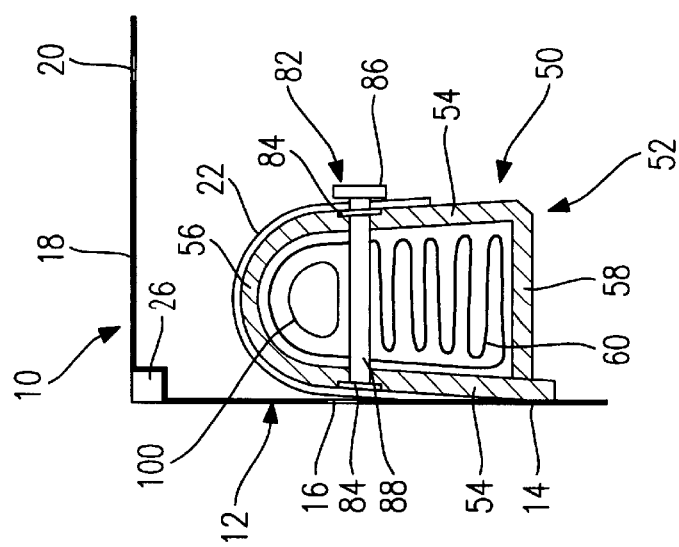

HAND GRIP BRACKET AND ASSEMBLY COMPRISING A HAND GRIP BRACKET AND A HEAD SIDE GAS BAG MODULE

BACKGROUND OF THE INVENTION

The invention relates to a hand grip bracket for the attachment of a hand grip in a motor vehicle and to an assembly of the bracket according to the invention with a head side gas bag module.

Such hand grip brackets are normally provided in the transition area between the door and the roof of a motor vehicle and are firmly screwed to the vehicle body, in order to provide an occupant with a firm means of holding on to a hand grip attached to the bracket. If the vehicle is equipped with a side impact protection device in the form of a head side gas bag for the head area of the occupant, which device covers the side window of a vehicle, a side gas bag module provided for this purpose is likewise accommodated in the transition area between door and roof along the roof frame of the vehicle. Normally, a detent plate bracket serves to hold the side gas bag module. This means that so far two different components have been provided for the two purposes mentioned, which involves the disadvantages of a high installation expenditure, the cost of additional components and the need for additional screw points in the vehicle body.

SUMMARY OF THE INVENTION

The object of the invention—in a motor vehicle provided with a side gas bag—is therefore to reduce the number of components for a hand grip bracket and for a detent plate bracket, as well as the labor and cost of both manufacture and installation.

The solution of this object is achieved in accordance with the invention in that, in a hand grip bracket as mentioned above, a holder is provided for accommodating a side gas bag module. This means that the hitherto separate detent plate bracket is now integrated into the hand grip bracket. In this way, the above-mentioned disadvantages are avoided, at the same time achieving a reduction in weight as compared with the use of two separate assembly units. Furthermore, the elimination of one assembly unit implies advantages as to manufacturing costs and logistics, i.e. the coordination of the parts supplied for the manufacture of the motor vehicle is simplified.

According to a preferred embodiment of the invention, the holder for accommodating a side gas bag module is formed in one piece with the hand grip bracket, resulting in a further simplification of the manufacturing and installation processes, and a further reduction of the associated costs.

In addition, the invention relates to an assembly of a hand grip bracket according to the invention and a side gas bag module attached thereto in a form-fitting manner. The side gas bag module has an elongate accommodation housing with a head gas bag contained therein. The accommodation housing is adapted for being attached to the roof frame of a vehicle via the hand grip bracket.

According to a preferred embodiment, at least one holding means projects from the housing, which holding means penetrates into a corresponding mounting hole in the holder and fixes the housing at the holder.

To facilitate the introduction of the side gas bag module into the hand grip bracket when installing the same in the vehicle, a guideway is provided in the holder, which guideway accommodates the holding means and guides the same into the mounting hole when the housing and the hand grip bracket are pushed together. This facilitates the alignment of the parts to create the positive connection. Moreover, a projection may, however, also be provided at the housing, which projection has nothing got to do with the holding means, but merely protrudes into a guideway and serves for the alignment of housing and hand grip bracket.

The mounting hole provided in the holder preferably is an oblong hole which has its maximum dimension in the direction of the longitudinal extent of the housing. Providing an oblong hole has the advantage that housing and hand grip bracket are still longitudinally movable within certain limits and tolerances can be compensated.

For a simple fixation, a latching nose may for instance be provided as holding means, which latching nose projects from the outside of the housing and protrudes into the mounting hole.

Furthermore, a hollow rivet may for instance also be used as holding means, which connects opposing wall portions of the housing with each other. The hollow rivet itself may, for instance, project laterally and protrude into the mounting hole in the housing. It is, however, also possible that it does not project from the outside of the housing and only serves as nut for a screw which protrudes from the outside through the mounting hole of the holder and is screwed into the hollow rivet.

Further advantageous aspects of the invention can be taken from the sub-claims.

BRIEF DESCRIPTION OF THE DRAWINGS

The invention will subsequently be described with reference to a preferred embodiment which is represented in the attached drawings, in which

FIG. 3 shows a perspective view of an assembly according o the invention with a hand grip bracket modified with respect to the hand grip bracket shown in FIG. 1, and with a housing as part of the side gas bag module; and FIG. 4 shows a cross-sectional view of the mounted assembly along line IV—IV in FIG. 3.

DETAILED DESCRIPTION OF THE DRAWINGS

Figure 1:
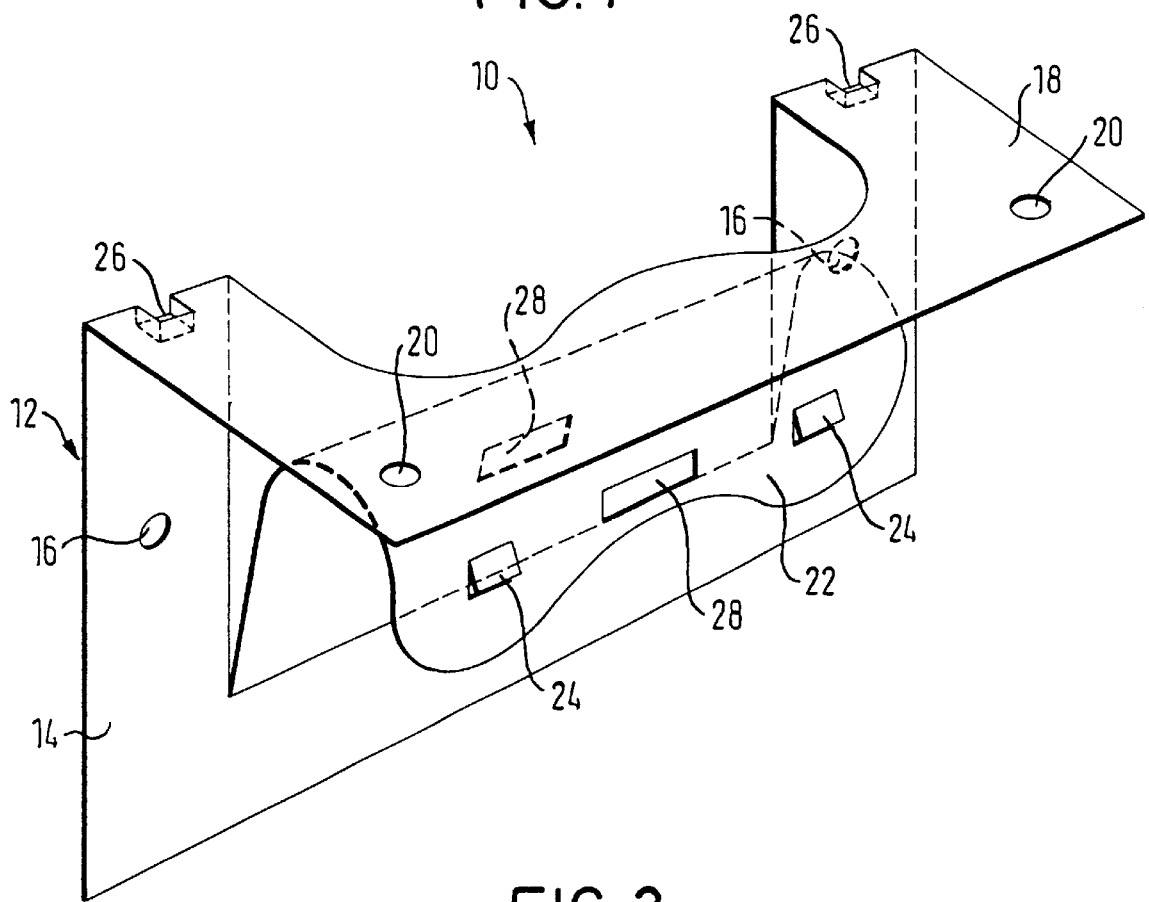
FIG. 1 shows a perspective view of a hand grip bracket.
Figure 2:
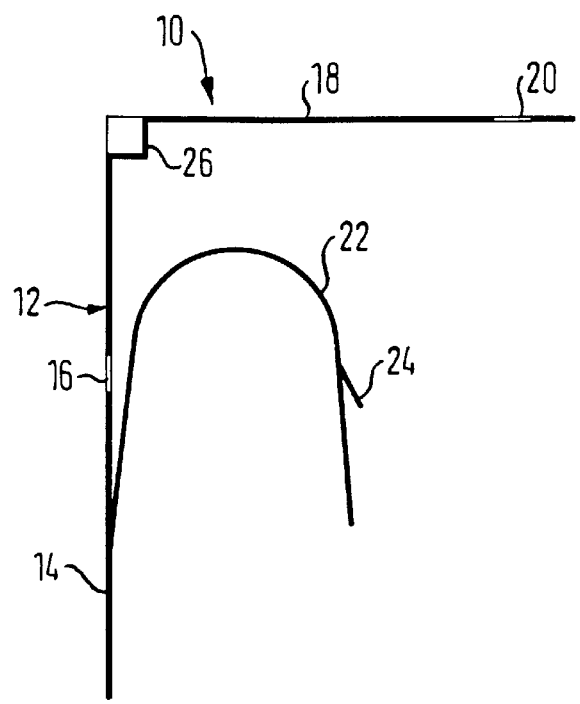
FIG. 2 shows a cross-sectional view of the hand grip bracket.

In FIGS. 1 and 2 the hand grip bracket 10 is represented, which is made of an originally rectangular holding plate 12. The holding plate 12 has a 90° bend which extends in longitudinal direction and divides the holding plate into an attachment section 14 and a holding section 18. The attachment section 14 facing the vehicle inner wall when installed, has screw holes 16 for the attachment of the hand grip bracket 10 to the vehicle body (not shown). The holding section 18 bent towards the vehicle inner side when installed, is provided with two screw holes 20 for the attachment of a hand grip (not shown).

In the originally flat holding plate 12, a central area is cut out along three sides of a rectangle, the sides being substantially at right angles to each other. The cutout area is bent towards the inside of the vehicle in an appropriate way to form a holder 22, the fourth side of the cutout section forming the connection with the remainder of the holding plate 12. A holder 22 with an arc-shaped cross-section, as shown in FIG. 2, is relatively easy to produce. The holder 22 is provided with a plurality of mounting holes in the form of bent-out sections 24 for the attachment of the side gas bag module, in which bent-out sections corresponding latching noses of the side gas bag module housing can engage. The bent area of the holding plate 12, which serves as holder 22, is shaped in such a way as to achieve a form-fitting connection with the side gas bag module housing. The upper portion of the holding plate 12, provided with the screw holes 20 for the attachment of the hand grip, extends so far beyond the side gas bag module holder 22 towards the inside of the vehicle that a sufficient distance exists between the installed hand grip and the holder 22. Several sections 26, bent out against the main bending direction, are provided in the area of the bending region in the holding plate 12, which sections promote the stability of the bent holding plate 12.

Although some material is punched out between the screw points 20 for the hand grip, and is reshaped to form the holder 22 of the side gas bag module, a force absorption of 1 kN, for which conventional hand grip brackets are designed, is assured. There are so many cutouts 28 in the reshaped material that on the one hand a significant reduction in weight is assured, whilst on the other hand still guaranteeing the strength required for accommodating the side gas bag module.

FIG. 3 illustrates an assembly consisting of the hand grip bracket 10 and a side gas bag module 50 to be attached thereto in a form-fitting manner, of which side gas bag module only an accommodation housing 52 is represented in FIG. 3 for simplification reasons. The accommodation housing 52 is U-shaped (cf. FIG. 4) and has two opposing, almost parallel wall portions 54 as well as a connecting web 56 and a flap 58, which according to FIG. 4 can swivel open in downward direction. In the accommodation housing 50 a head side gas bag 60 is accommodated, which can cover the side window or several side windows of a vehicle in the case of restraint. In FIGS. 3 and 4 various fastening means are shown, which serve the attachment of the housing 52 to the holder 22. These various fastening means may be used individually or be combined with each other as desired.

A first fastening means consists of a holding means in the form of a formed-on latching nose 70 which projects from the outside of the housing 52. When the housing 52 is inserted into the holder 22 from below, this latching nose 70 penetrates into the mounting hole in the form of the bent-out sections 24 and prevents the housing 52 from falling out again in downward direction.

A second fastening means consists of a holding means in the form of a spacer sleeve, which is shown in detail in FIG. 4. This spacer sleeve may also constitute a hollow or semi-hollow rivet. The spacer sleeve is designated with 82 and connects the opposing wall portions 54 with each other and in the vicinity of its axial ends has two flanges 84 which prevent the wall portions 54 from being urged to the outside upon deployment of the side gas bag. The right-hand end of the spacer sleeve shown in FIG. 4 also has a pin-shaped projection projecting to the right from the flange 84 and having a collar 86. Between the flange 84 and the collar 86 a portion of reduced cross-section is obtained, which approximately corresponds to the cross-section of the shank 88 connecting the flanges 84 with each other. The pin-shaped projection with the collar 86 laterally projects from the housing 52. When upwardly inserting the housing 52 into the holder 22 in the direction of the arrow, the pin-shaped projection with the collar 86 gets into a guideway 90 provided at the holder, which guideway is formed by bending the holder to the outside. Via the guideway 90, the collar 86 is guided into the adjoining mounting hole 124 in the form of a keyhole opening. The right-hand portion of the keyhole opening is slightly larger. In this portion, the collar 86 can be introduced into the mounting hole and subsequently be moved to the left into the portion of the keyhole opening of reduced height. The holder 22 then lies between the flange 84 and the collar 86, as can be seen in FIG. 4. In this case, the pin-shaped projection with the collar 86 also serves as holding means.

A third fastening means consists of a hollow rivet 94 which connects the opposing wall portions 54 with each other, as is shown in FIG. 3 with reference to the spacer sleeve. The hollow rivet likewise has flanges corresponding to the flanges 84. It does, however, not have pin-shaped projection with collar 86. Thus, the hollow rivet does not or only hardly project from the outside of the housing 52. When inserting the housing 52 into the holder 22, the hollow rivet comes to lie at the level of an oblong hole 224, the oblong hole 224 having its maximum dimension in longitudinal direction of the elongate housing 52. A self-tapping or self-grooving screw 96 is screwed from the outside through the oblong hole 224, which serves as mounting hole, into the hollow rivet 94, which serves as nut.

In the interior of the housing 52 there is also provided a gas conduit lance 100 above the hollow rivet 94 and the spacer sleeve 82, through which lance gas flows into the interior of the head side gas bag. As soon as the side gas bag is inflated, the flap 58 swivels downwards and clears the way for the deployment of the side gas bag 60.

What is claimed is:

1. A hand grip bracket having a hand grip attachment in a motor vehicle, characterized in that said bracket further includes a side gas bag module holder (22).

2. The hand grip bracket (10) as claimed in claim 1, characterized in that the holder (22) for the side gas bag module is formed in one piece with the hand grip bracket (10).

3. The hand grip bracket (10) as claimed in claim 1, characterized in that the hand grip bracket (10) is made of sheet metal.

4. The hand grip bracket as claimed in claim 3, characterized in that the hand grip bracket (10) is made of a holding plate (12) with a 90° bend, a plurality of sections (24) bent out against a main bending direction being provided in an area of a bending region.

5. The hand grip bracket (10) as claimed in claim 1, characterized in that the holder (22) has mounting holes in the form of bent-out sections (24).

6. The hand grip bracket (10) as claimed in claim 1, characterized in that recesses (28) have been punched into the holder (22).

7. The hand grip bracket as claimed in claim 1, characterized in that the holder (22), as seen in a cross-section perpendicular to a bending edge of a holding plate (12), extends in a shape of an arc.

8. The hand grip bracket (10) as claimed in claim 1, characterized in that the holder (22) extends towards the inside of the vehicle.

9. An assembly of a hand grip bracket (10) as claimed in claim 1 and a side gas bag module (50) attached thereto in a form-fitting manner, which side gas bag module has an elongate accommodation housing (52) with a head side gas bag (60) contained therein, and the accommodation housing (52) is adapted for being attached to the roof frame of a vehicle via the hand grip bracket (10).

10. The assembly as claimed in claim 9, characterized in that at least one holding means projects from the housing (52), which holding means penetrates into a corresponding mounting hole (24; 124) and fixes the housing (52) at the holder (22).

11. The assembly as claimed in claim 10, characterized in that the holding means is a latching nose (70) projecting from the outside of the housing (52).

12. The assembly as claimed in claim 10, characterized in that in the holder (22) a guideway (90) is provided, which accommodates a holding means laterally projecting from the housing (52) and guides the same into a mounting hole (124) in the holder (22) when the housing (52) and the hand grip bracket (10) are pushed together.

13. The assembly as claimed in claim 9, characterized in that a mounting hole (224) in the holder (22) constitutes an oblong hole which has its maximum dimension in a direction of a longitudinal extent of the housing (52).

14. The assembly as claimed in claim 9, characterized in that a holding means is provided which connects opposing wall portions (54) of the housing (52) with each other and constitutes a hollow rivet (94) or spacer sleeve (82).

15. The assembly as claimed in claim 14, characterized in that the holding means is a hollow rivet (94) and the holder (22) is connected with the housing (52) via a screw (96) which has been screwed into the hollow rivet (94).

16. Apparatus comprising:
   a bracket having structure for attachment of the bracket to a vehicle;
   said bracket having a hand grip attachment for attaching a hand grip to said bracket; and
   said bracket having an air bag module attachment for attaching an air bag module to said bracket.

* * * * *